US011680351B2

(12) United States Patent
Lee et al.

(10) Patent No.: US 11,680,351 B2
(45) Date of Patent: Jun. 20, 2023

(54) WASHING MACHINE WITH CONDUIT FOR SUPPLYING WATER TO NOZZLES AT GASKET AND MANUFACTURING METHOD OF THE CONDUIT

(71) Applicant: LG Electronics Inc., Seoul (KR)

(72) Inventors: Junghoon Lee, Seoul (KR); Jaehyun Kim, Seoul (KR); Kyungchul Woo, Seoul (KR); Myunghun Im, Seoul (KR); Hwanjin Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 890 days.

(21) Appl. No.: 16/430,949

(22) Filed: Jun. 4, 2019

(65) Prior Publication Data

US 2019/0368113 A1 Dec. 5, 2019

(30) Foreign Application Priority Data

Jun. 4, 2018 (KR) .................. 10-2018-0063983

(51) Int. Cl.
*D06F 39/08* (2006.01)
*D06F 37/26* (2006.01)
(Continued)

(52) U.S. Cl.
CPC ............ *D06F 37/266* (2013.01); *B29C 48/03* (2019.02); *B29C 48/14* (2019.02); *B29C 48/16* (2019.02);
(Continued)

(58) Field of Classification Search
CPC ...... D06F 37/266; D06F 37/04; D06F 39/088; D06F 39/083; B29C 48/14; B29C 48/16; B29C 48/03
(Continued)

(56) References Cited

U.S. PATENT DOCUMENTS 5,104,472 A 4/1992 Kasugai et al.
2014/0033449 A1* 2/2014 Im .................. D06F 33/34
8/137

(Continued)

FOREIGN PATENT DOCUMENTS

CN 102418257 4/2012
CN 107604603 1/2018
(Continued)

OTHER PUBLICATIONS

JPH08192457A—machine translation (Year: 1996).*
(Continued)

*Primary Examiner* — Tinsae B Ayalew
(74) *Attorney, Agent, or Firm* — Fish & Richardson P.C.

(57) ABSTRACT

A washing machine includes a casing, a tub, a drum, a circulation pump, an annular gasket connecting between openings of the casing and the tub and including circulation nozzles configured to supply water into the drum, and a conduit fixed to the gasket and guiding water to the circulation nozzles. The conduit includes an inlet port configured to receive water from the pump, a transport pipe configured to guide water from the inlet port to the circulation nozzles, and a supply ports configured to supply water to the circulation nozzles. A method for manufacturing a conduit includes positioning supply ports in a cavity defined at a first mold, forming a parison having a hollow opening by extruding a raw material, positioning the parison in the cavity, combining the first mold and a second mold, and injecting gas into the hollow opening of the parison.

12 Claims, 9 Drawing Sheets

(51) Int. Cl.
    *B29C 48/14*     (2019.01)
    *B29C 48/16*     (2019.01)
    *B29C 48/03*     (2019.01)
    *D06F 37/04*     (2006.01)

(52) U.S. Cl.
    CPC ............ *D06F 39/088* (2013.01); *D06F 37/04* (2013.01); *D06F 39/083* (2013.01)

(58) Field of Classification Search
    USPC .......................................................... 8/158
    See application file for complete search history.

(56) References Cited

U.S. PATENT DOCUMENTS

2015/0128657 A1     5/2015     Kim et al.
2016/0130740 A1     5/2016     Im et al.

FOREIGN PATENT DOCUMENTS

| | | |
|---|---|---|
| EP | 1114711 | 7/2001 |
| EP | 1788138 | 5/2007 |
| EP | 2698462 | 2/2014 |
| EP | 2719814 | 4/2014 |
| JP | H05212776 | 8/1993 |
| JP | H06285963 | 10/1994 |
| JP | H08192457 | 7/1996 |
| JP | 2012070810 | 4/2012 |
| JP | 2017063950 | 4/2017 |
| WO | WO8904755 | 6/1989 |
| WO | WO2014037840 | 3/2014 |

OTHER PUBLICATIONS

Partial European Search Report in European U.S. Appl. No. 19/178,232, dated Sep. 5, 2019, 15 pages.
Extended European Search Report in European Application No. 19178232.5, dated Jan. 23, 2020, 16 pages.
Office Action in Chinese Appln. No. 201980051871.7, dated Sep. 5, 2022, 17 pages (with English translation).

* cited by examiner

WASHING MACHINE WITH CONDUIT FOR SUPPLYING WATER TO NOZZLES AT GASKET AND MANUFACTURING METHOD OF THE CONDUIT

CROSS-REFERENCE TO RELATED APPLICATION

This application claims the priority benefit of Korean Patent Application No. 10-2018-0063983, filed on Jun. 4, 2018, the disclosure of which is incorporated herein by reference.

BACKGROUND OF THE INVENTION

1. Field of the Invention

The present invention relates to a washing machine with a plurality of circulation nozzles formed in a conduit provided at an annular gasket that seals the entrance of a tub.

2. Description of the Related Art

A well-known type of washing machine is a washing machine having a tub with an introduction hole formed at the front and a drum rotatably provided in the tub. In order to prevent water leakage from the tub, an annular gasket is installed along the circumference of the laundry receiving hole of the tub. Nozzles for spraying water circulating by a circulation pump into the drum are formed in the gasket.

A conduit for guiding water pumped by the circulation pump to the circulation nozzles is coupled to the circumference of the gasket. A passage for guiding circulating water, pumped by the circulation pump, along a predetermined path is formed in the conduit, and a plurality of ports extends from the passage to supply the circulating water to the circulation nozzles.

This type of conduit is generally formed by extrusion molding. FIG. 9A schematically illustrates molds assembled according to a conventional manufacturing method (extrusion molding), and FIG. 9B illustrates an opened-up state of the mold.

As shown in FIGS. 9A and 9B, in order to extrude a conduit in the aforementioned shape by the conventional method, a pair of molten parison sheets 810 and 820 are assembled with a left mold 910 and a right mold 920 therebetween, and air is injected into a space between the pair of parison sheets 810 and 820. The parison expands by the injected air and is thereby molded into the shape of a cavity (corresponding to the exterior appearance of the conduit) formed in the molds 910 and 920.

However, after a molded object is extracted from the molds 910 and 920, this method requires a process of cutting the parison sheets or process an engaged portion of the parison sheets in order to completely extract the engaged portion of the both molds 910 and 920 from the parison sheets. In addition, there is a possibility of a leakage due to strap in a mold step and a parting line.

In addition, there is a problem that large part of the parison is wasted, as shown in a portion marked with oblique lines in FIG. 9B.

SUMMARY OF THE INVENTION

An object of the present invention is to provide a washing machine with an improved process of manufacturing a conduit, which supplies circulating water to a plurality of circulation nozzles formed in a gasket, and a manufacturing method for the conduit.

A second object of the present invention is to solve the conventional problem that water leaks due to manufacturing defects.

A third object of the present invention is to reduce a waste of resources in a manufacturing process for the conduit.

The present invention provides a washing machine, including: a casing having an introduction hole formed therein; a tub having an entrance opening formed therein to communicate with the introduction hole; a drum rotatably disposed in the tub; a pump configured to pump water discharged from the tub; an annular gasket allowing the introduction hole and the entrance opening of the tub to communicate with each other, and having a plurality of circulation nozzles configured to water into the drum; and a conduit fixed to the gasket, and guiding the water pumped by the pump to the plurality of circulation nozzles.

The conduit may include a transport pipe configured to guide water introduced through an inlet port and pumped by the pump, and a plurality of nozzle water supply ports configured to distributing the water guided along the transport pipe to the plurality of circulation nozzles.

An inlet port may be formed in the transport pipe to allow the water pumped by the pump to inflow through the inlet port. The transport pipe may bidirectionally divide the water introduced through the inlet port to be guided along the circumferential direction. The plurality of circulation nozzles are disposed in the transport pipe.

A plurality of communication holes respectively communicating with the plurality of nozzle water supply ports may be formed on an inner diameter part of the transport pipe, and a port connection groove with an entrance portion of each of the plurality of nozzle water supply ports to be inserted thereinto may be formed on a circumference of each of the plurality of communication holes. The entrance portion of each of the plurality of nozzle water supply ports may be bonded to the inner diameter part within the port connection groove.

The entrance portion of each of the plurality of nozzle water supply ports may include a flange that extends outwardly in a radial direction from an entrance thereof through which water discharged from a corresponding communication hole among the plurality of communication holes is introduced. The port connection groove may be formed in a shape corresponding to a shape of the flange, thereby allowing the flange to be bonded to the inner diameter part within the port connection groove.

The plurality of circulation nozzles may be provided in an inner circumferential part of the gasket, and the transport pipe in the conduit may be disposed in an outer circumferential part of the gasket, and the plurality of nozzle water supply ports may pass through the gasket from the outer circumferential part to the inner circumferential part to be respectively connected to the plurality of circulation nozzles.

The transport pipe and the plurality of water supply ports may be formed of different materials.

The present invention provides a method of manufacturing a conduit supplying circulating water to a plurality of circulation nozzles formed in a gasket of a washing machine, the method including: positioning a plurality of nozzle water supply ports in a cavity of a lower mold; forming a molten parison having a hollow opening, by extruding a raw material; positioning the parison in the cavity of the lower mold; assembling an upper mold and the lower mold; and injecting gas into the hollow opening.

A extrusion temperature of the parison may be from 195° C. to 205°. A temperature of the parison may be from 180° C. and 190° C. at a time when the injecting of the gas into the hollow opening starts.

The method may further include: opening up the upper mold and the lower mold; extracting a molded object, in which the parison and the plurality of nozzle water supply ports are engaged, from the cavity; and removing the parison from the plurality of nozzle water supply ports.

The method may further include comprising processing an inlet port communicating with the hollow opening of the parison in the extracted molded object.

The method may further include, before the positioning of the parison in the cavity of the lower mold, positioning an inlet port in the cavity of the lower mold.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
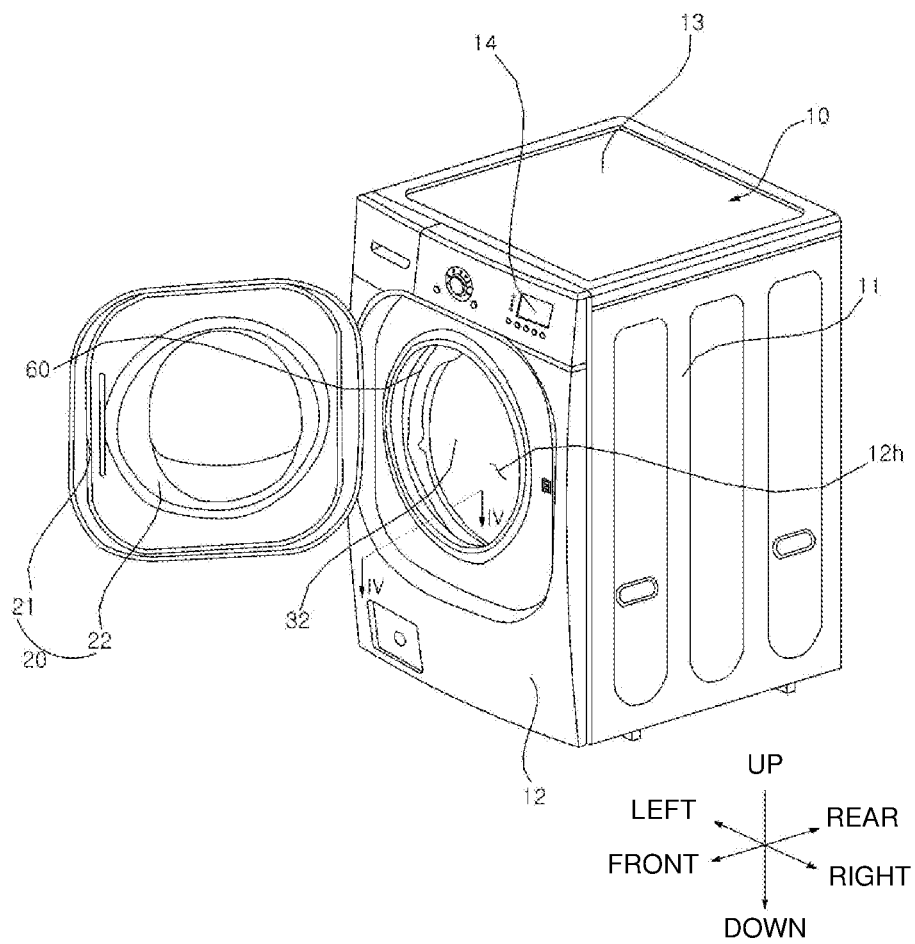
FIG. 1 is a perspective view of a washing machine according to an embodiment of the present invention.

Advantages and features of the present invention and methods for achieving them will be made clear from the embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is defined only by the scope of the claims. Like reference numerals refer to like elements throughout the specification.

Figure 2:
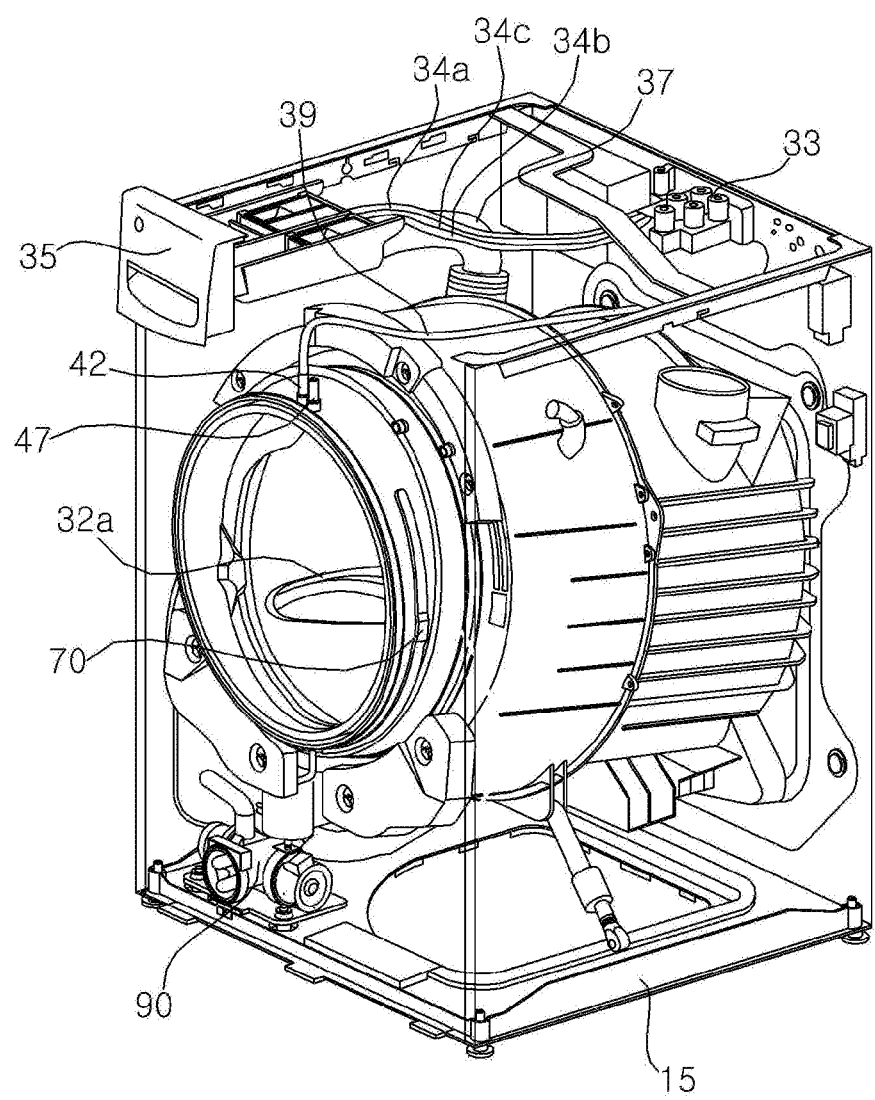
FIG. 2 is a view illustrating part of the washing machine shown in FIG. 1.
Figure 3:
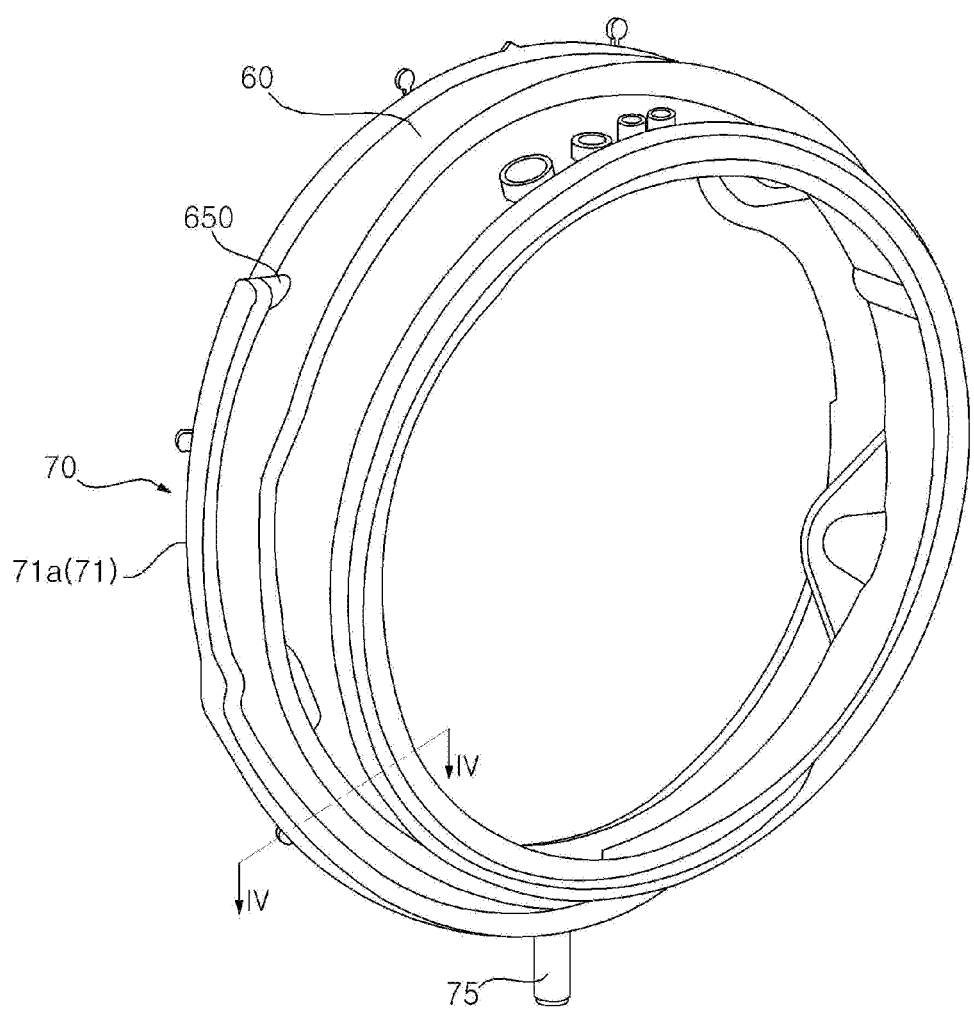
FIG. 3 illustrates an assembly of a gasket and a conduit.
Figure 4:
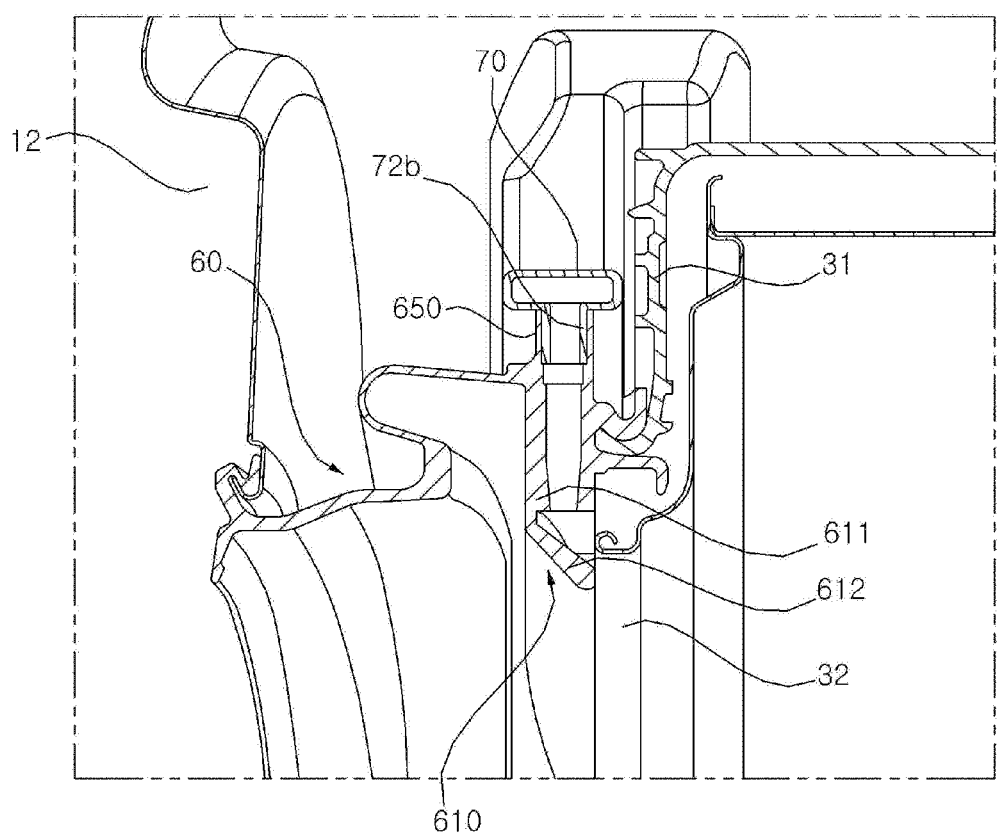
FIG. 4 is a cross-sectional view taken along line IV-IV in FIG. 1.
Figure 5:
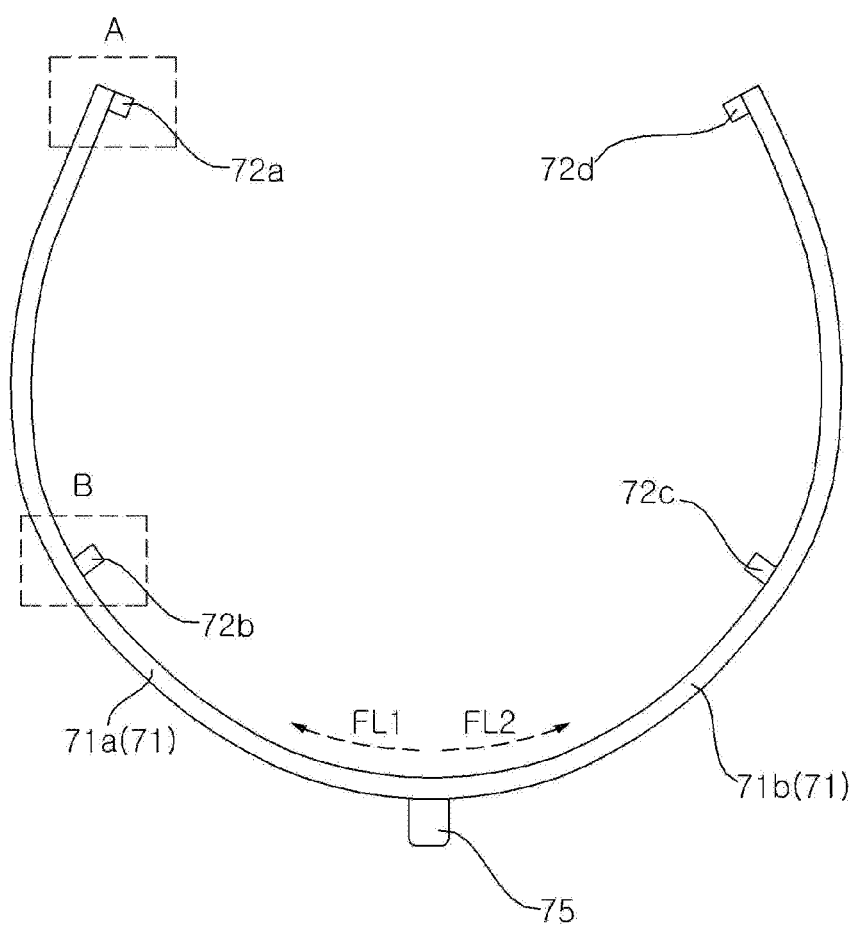
FIG. 5 illustrates a conduit.
Figure 6A:
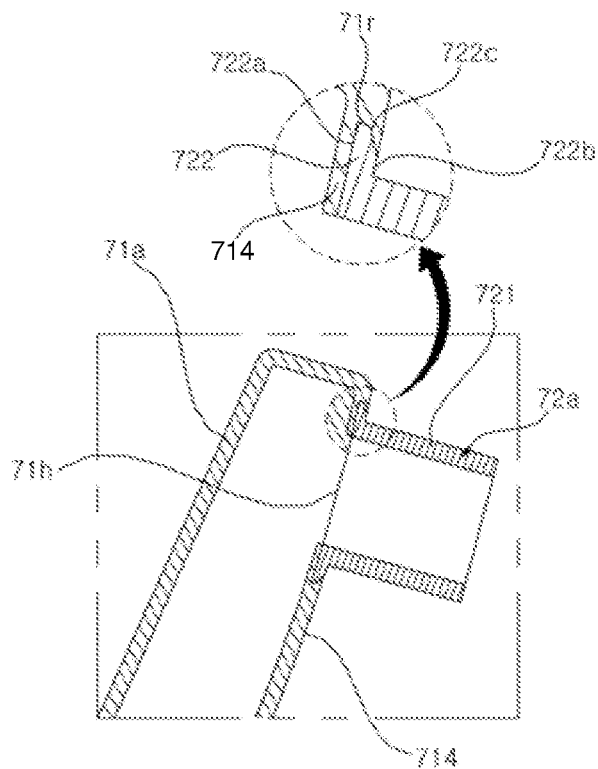
FIG. 6A is an enlarged view of portion A in FIG. 5.
Figure 6B:
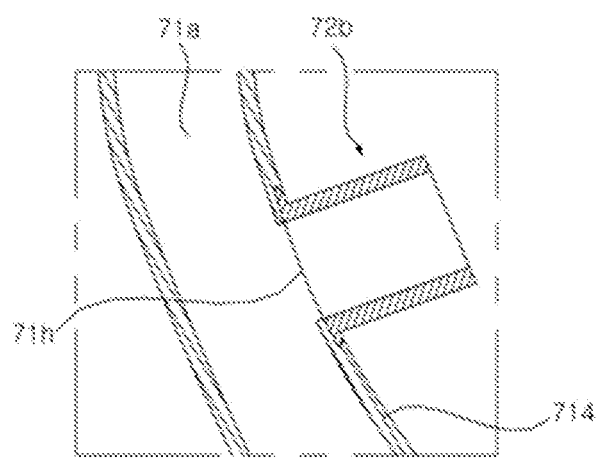
FIG. 6B is an enlarged view of portion B in FIG. 5.

FIG. 1 is a perspective view of a washing machine according to an embodiment of the present invention. FIG. 2 is a view illustrating part of the washing machine shown in FIG. 1. FIG. 3 illustrates an assembly of a gasket and a conduit. FIG. 4 is a cross-sectional view taken along line IV-IV in FIG. 1. FIG. 5 illustrates a conduit. FIG. 6A is an enlarged view of portion A in FIG. 5, and FIG. 6B is an enlarged view of portion B in FIG. 5.

Referring to FIGS. 1 to 6B, a casing 10 forms an exterior appearance of a washing machine, and an introduction hole 12h through which laundry is to be loaded is formed on a front surface of the casing 10. The casing 10 may include: a cabinet 11 having an open front surface, a left surface, right surface, and a rear surface; and a front panel 12 coupled to the open front surface of the cabinet 11 and having the introduction hole 12h formed therein.

The cabinet 11 may have an open bottom surface and an open top surface, and a horizontal base 15 supporting the washing machine may be coupled to the bottom surface of the cabinet 11. In addition, the casing 10 may further include a top plate 13 covering the open top surface of the cabinet 11, and a control panel 14 disposed over the front panel 12.

A tub 31 for containing water may be disposed in the casing 10. An entrance opening is formed on a front surface of the tub 31 so that laundry can be introduced. The cabinet 11 and the tub 31 are connected by the annular gasket 60 and thereby a passage for entrance and exit of laundry may be formed in a section from the entrance opening of the tub 31 to the introduction hole 12h.

The door 20 for opening and closing the introduction hole 12h may be rotatably coupled to the casing 10. The door 20 may include: a door frame 21 being open at an approximately central portion thereof and rotatably coupled to the front panel 12; and a window 22 installed at the open central portion of the door frame 21. The window 22 may be in a shape convex rearward, in which at least a portion of the window 22 is positioned in an area surrounded by an inner circumferential surface of the gasket 60.

A front end and a rear end of the basket 60 are annular, and the gasket 60 is in a tubular shape extending from the front end to the rear end. The front end of the gasket 60 is fixed to the casing 10, and the rear end of the gasket 60 is fixed to the circumference of the entrance opening of the tub 31. The gasket 60 may be formed of a flexible or elastic material. The gasket 60 may be formed of rubber or synthetic resin. When the door 20 is closed, the front end of the gasket 60 is brought into contact with a rear surface of the door 20, thereby preventing that water leaks from the tub 31 through an entrance opening of the gasket 60.

Hereinafter, a position defines the inside of the tubular shape of the gasket 60 is referred to as an inner circumferential part (or an inner circumferential surface) of the gasket 60, and a portion opposite thereto is referred to as an outer circumferential part (or an outer circumferential surface) of the gasket 60.

The drum 32 may be rotatably provided in the tub 31. The drum 32 is to receive laundry and disposed with an entrance opening hereof positioned at the front, the entrance opening through which laundry is to be introduced, and the drum 32 is rotated about an approximately horizontal axis. In this case, "horizontal" does not refer to the mathematical definition thereof. That is, even in the case where the axis is inclined at a predetermined angle relative to a horizontal state, the axis may be considered substantially horizontal if the axis is more like in the horizontal state than in a vertical state. To allow water to flow from the tub 31 to the drum 32, a plurality of through-holes 32h may be formed in the drum 32.

A plurality of lifter 32a may be provided on an inner side surface of the drum 32. The plurality of liters 32a may be disposed at a predetermined angle relative to the center of the drum 32. When the drum 32 is rotated, laundry repeatedly undergoes an operation of being lifted by the lifter 32a and falling.

A driving unit for rotating the drum 32 is further provided. A driving shaft (not shown) to be rotated by the driving unit may penetrate the rear of the tub 31 and be thereby coupled to the drum 32.

Preferably, the driving unit includes a direct drive wash motor, and the wash motor may include a stator fixed to the rear of the tub 31, and a rotor rotating by a magnetic force applying in relation with the stator. The driving shaft may rotate integrally with the rotor.

The tub 31 may be supported by a damper 16 installed at the base 15. Vibration of the tub 31 caused by rotation of the drum 32 is attenuated by the damper 16. In some embodiments, although not illustrated, a hanger (e.g., a spring) for hanging the tub 31 to the casing 10 may be further provided.

There may be provided at least one water supply horse (not shown) guiding water introduced from an external water source such as a water tap or the like, and a water supply unit 33 for controlling the water supplied through the at least one water supply horse to flow to at least one water supply pipe 34a, 34b, or 34c which will be described later.

A dispenser 35 for supplying additives such as detergent for washing, fabric softener, and the like into the tub 31 or the drum 32 may be provided. The additives are contained in the dispenser 35 separately by types thereof. The dispenser 35 may include a detergent container (not shown) for containing a detergent for washing, and a fabric softer container (not shown) for containing a fabric softener.

At least one water supply pipe 34a, 34b, or 34c for selectively guiding water, supplied from the water supply unit 33, to each container of the dispenser 35 may be provided. The water supply unit 33 may include at least one water supply valve for regulating each of the at least one water supply pipe 34a, 34b, or 34c.

The at least one water supply pipe 34a, 34b, or 34c may include a first water supply pipe 34a for supplying cold water supplied through a cold water supply horse to the detergent container, a second water supply pipe 34b for supplying water supplied through the cold water supply horse to the fabric softer container; and a third water supply pipe 34c for supplying hot water supplied through a hot water supply horse to the detergent container.

The gasket may include a direct water nozzle 42 for spraying water into the drum 32, and a direct water supply pipe 39 for guiding water supplied from the water supply unit 33 to the direct water nozzle 42. The direct water nozzle 42 may be a whirl nozzle or a spray nozzle, but aspects of the present invention are not necessarily limited thereto.

Water discharged from the dispenser 35 may be supplied to the tub 31 through a water supply bellows 37. A water supply hole (not shown) connected to the water supply bellows 37 may be formed on a side surface of the tub 31.

A drain hole for draining water may be formed in the tub 31, and a drain bellows 17 may be connected to the drain hole. A pump 90 for pumping water drained from the tub 31 through the drain bellows 17 may be provided. A drain valve (not shown) for regulating the drain bellows 17 may be further provided. The water drained through the drain bellows 17 may be drained to the outside of the washing machine through a drain pipe (not shown).

The pump 90 may selectively perform a draining function of pumping water drained through the drain bellows 17 to the drain pipe, and a circulating function of pumping water to a circulation pipe 18. There are already various well-known technologies for selectively implementing the draining function and the circulating function with one pump, and thus, a detailed description thereof is herein omitted.

However, aspects of the present invention are not limited thereto, and a circulation pump connected to the circulation pipe 18 to circulate water and a drain pump connected to the drain pipe to drain water may be provided separately.

Hereinafter, circulating water pumped by the pump 90 to be guided along the circulation pipe 18 may be referred to as circulating water.

A flow rate (or water discharge pressure) of the pump 90 is variable. To do so, a pump motor rotating an impeller may be a variable speed motor of which speed of rotation can be controlled. The pump motor may be appropriately a Brushless Direct Current Motor (BLDC) motor, but aspects of the present invention are not necessarily limited thereto. A driver for controlling speed of the pump motor may be further provided, and the driver may be an inverter driver. The inverter driver may convert AC power into DC power and input the converted power to the motor at a target frequency.

A controller (not shown) for controlling the above-described pump motors may be further provided. The controller may include a Proportional-Integral (PI) controller, a Proportional-Integral-Derivative (PID) controller), and the like. The controller may receive an output value (e.g., an output current) of a pump motor, and control an output value of the driver based on the received output value of the pump motor so as to control the number of times of rotation of the pump motor to follow a preset target number of times of rotation.

A plurality of circulation nozzles 610 for spraying water (circulating water) into the drum 32 is provided at the gasket 60. The plurality of circulation nozzles 610 may be formed in the inner circumferential part of the gasket 60. When the gasket 60 is viewed from the front, the plurality of circulation nozzles 610 may be disposed such that two nozzles are respectively and symmetrically positioned on the left side and the right side of the gasket 60.

Out of two circulation nozzles 610 provided on one side of the gasket 60, a first circulation nozzle 610 (a circulation nozzle connected to a nozzle water supply port 72b which will be described later) at a lower position sprays circulating water upward, whist a second circulation nozzle 610 (a circulation nozzle connected to a nozzle water supply port 72a which will be described later) at an upper position sprays circulating water downward.

A conduit 70 guides circulating water, pumped by the pump 90, to the plurality of circulation nozzles 610, and the conduit 70 is fixed to the gasket 60. The conduit 70 includes: a transport pipe 71 for guiding water introduced through an inlet port 75; and a plurality of nozzle water supply ports 72a, 72b, 72c, and 72d for distributing the water guided along the transport pipe 71 into the plurality of circulation nozzles 610 provided at the gasket 60. The transport pipe 71 may guide the water introduced through the inlet port 75 by dividing the water in both directions. The transport pipe 71 may be formed in a shape corresponding to the exterior appearance of the gasket 60, thereby enabled to guide circulating water in an approximately circumferential direction (or a direction that extends along the annular outer circumferential part of the gasket 60).

The transport pipe 71 forms a channel along which circulating water flows, and the transport pipe 71 is connected to the exit of the inlet port 75. The transport pipe 71 may include: a first pipe part 71a for guiding a first subflow F11 of circulating water, introduced through the inlet port 75, in a first direction; and a second pipe part 71b for guiding a second subflow FL2 of the circulating water, introduced through the inlet port 75, in a second direction. The first pipe part 71a and the second pipe part 71b may be symmetric to each other. In each of the first pipe part 71a and the second pipe part 71b, one end through which circulating water is introduced through the inlet port 75 is open and the other end is blocked.

The conduit includes a plurality of nozzle water supply ports 72a, 72b, 72c, and 72d protruding from the transport pipe 71. The plurality of nozzle water supply ports 72a, 72b, 72c, and 72d is formed at positions respectively corresponding to the plurality of circulation nozzles 610. In the present embodiment, as shown in FIG. 5, the plurality of nozzle water supply ports 72a, 72b, 72c, and 72d are disposed such that two nozzle water supply ports are respectively positioned on the left side and the right side of the inlet port 75. However, aspects of the present invention are not limited thereto, and the number of the circulation nozzles 610 and the number of nozzle water supply ports 72a, 72b, 72c, and 72d corresponding thereby may vary.

Meanwhile, each of the nozzles 610 may include a nozzle inlet pipe 611 protruding inwardly from the inner circumferential part of the gasket 60 in a radial direction, and a nozzle head 612 connected to the nozzle inlet pipe 611. The nozzle inlet pipe 611 has a port through-hole has one end, which is connected to the inner circumferential part of the gasket 60 and has a port through hole formed therein, and the other end, which is connected to a corresponding nozzle 610.

The gasket 60 may include a plurality of port insertion pipes 650 protruding from the outer circumferential part of the gasket 60 at positions respectively corresponding to nozzle inlet pipes 611. Each of the port insertion pipes 650 communicates with a corresponding nozzle inlet pipe 611, and each of the nozzle water supply ports 72a, 72b, 72c, and 72d is inserted into a corresponding port insertion pipe 650. Circulating water discharged from the nozzle water supply ports 72a, 72b, 72c, and 72d is supplied to the nozzle heads 612 through the nozzle inlet pipes 611.

In the transport pipe 71, at least one first nozzle water supply port 71a or 72b is formed on the first duct 71a along which the first subflow FL1 is guided. The first nozzle water supply ports 72a and 72b respectively discharges circulating water to the circulation nozzles 610 (circulation nozzles positioned on the left side when the gasket 60 is viewed from the front in the present embodiment).

The first pipe part 71a guides circulating water in a first direction (a clockwise direction when viewed from the front in the present embodiment) from the exit of the connection port 75 in a channel formed by the transport pipe 71.

Similarly, in the transport pipe 71, at least one nozzle water supply port 72c or 72d is formed on the second pipe part 71b along which the second subflow FL2 is guided. The second nozzle water supply ports 72c and 72d respectively discharge circulating water to the second circulation nozzles 610 (circulation nozzles positioned on the right side when the gasket 60 is viewed from the front in the present embodiment).

The second pipe part 71b guides circulating water in a second direction (a counter-clockwise direction when viewed from the front in the present invention) from the exit of the connection port 75 in the passage formed by the transport pipe 71.

The transport pipe 71 is disposed in the outer circumferential part of the gasket 60, and the plurality of nozzle water supply ports 72a, 72b, 72c, and 72d may penetrates the gasket 60 from the outer circumferential part to the inner circumferential part to be connected to the plurality of circulation nozzles 610, respectively.

In an inner diameter part 714 (an inner circumferential part connected to the nozzle water supply ports 72a, 72b, 72c, and 72d when the transport pipe 71 is viewed from front, as shown in FIG. 5) of the transport pipe 71, a plurality of communication holes 71h respectively communicating with the plurality of nozzle water supply ports is formed, and a port connection groove 71r with an entrance portion of each of the plurality of nozzle water supply ports 72a, 72b, 72c, and 72d to be inserted is formed on the circumference of each of the communication holes 71h. In addition, the entrance portion of each of the plurality of nozzle water supply ports 72a, 72b, 72c, and 72d is bonded to the inner diameter part 714 in the port connection groove 71r.

The entrance portion of each of the nozzle water supply ports 72a, 72b, 72c, and 72d may include a flange 722 that extends outwardly in a radial direction from an entrance thereof through which water discharged from the communication hole 71h is introduced. The port connection groove 71r of the inner diameter part 714 may be in a shape corresponding to a shape of the flange 722.

In the port connection groove 71r, the flange 722 may be bonded to the inner diameter part 714. In particular, the flange 722 is in a structure in which the entrance is formed on a first surface 722a in contact with a floor of the port connection grove 71r and in which an outer diameter of a second surface 722b spaced apart from the first surface 722a to thereby define a thickness of the flange 722 is smaller than an outer diameter of the first surface 722a, thereby forming a conical slope 722c connecting an outer circumference of the second surface and an outer circumference of the first surface 722a. However, this structure makes the flange 722 to be tightly fitted into the port connection groove 71r through a wedge structure, thereby allowing the nozzle water supply ports 72a, 72b, 72c, and 72d not to be easily separated from the transport pipe 71. In particular, in the case of manufacturing the conduit 70 by inserting the nozzle water supply ports 72a, 72b, 72c, and 72d into molten material forming the transport pipe 71, the slope 722c is embedded in the molten material, making the transport pipe 71 and the nozzle water supply ports 72a, 72b, 72c, and 72d to be tightly secured. In particular, the conduit 70 may be formed by blow molding which is the process of forming the transfer conduct 71 using parison. In this case, the nozzle water supply ports 72a, 72b, 72c, and 72d may be formed as separate molded object and then inserted into the parison. The parison may be formed of a material such as High-density polyethylene (HDPE), polypropylene (PP), or the like.

Preferably, the nozzle water supply ports 72a, 72b, 72c, and 72d and the parison or transfer conduit 71 are formed of the same material.

However, aspects of the present invention are not limited thereto, and the nozzle water supply ports 72a, 72b, 72c, and 72d and the parison or transfer conduit 71 may be formed of different materials.

Figure 7:
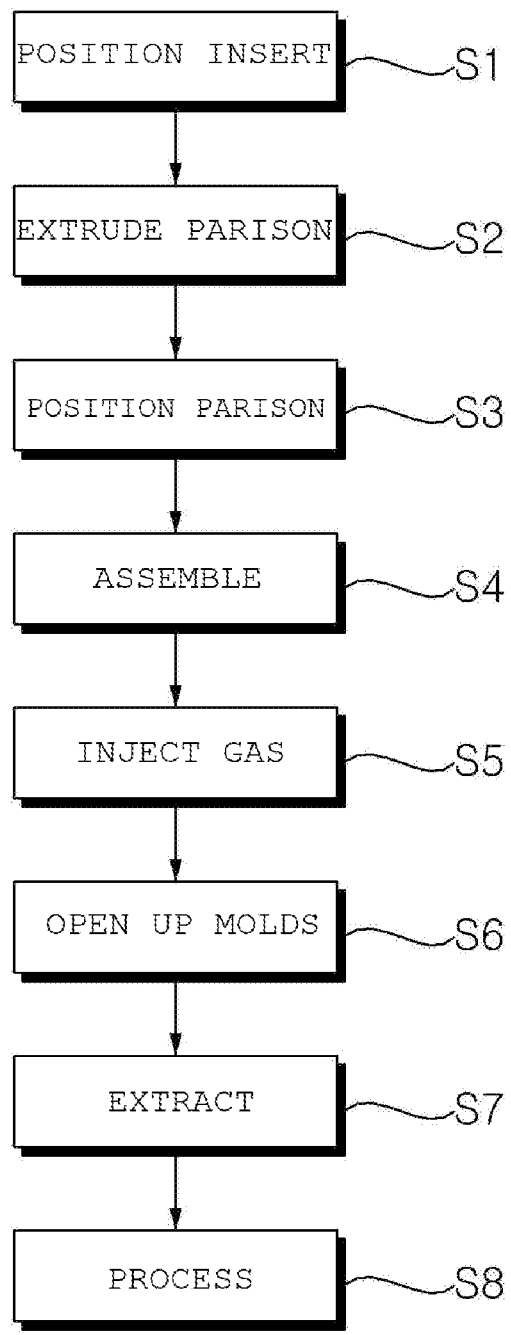
FIG. 7 is a flowchart illustrating a manufacturing method according to an embodiment of the present invention.
Figure 8A:
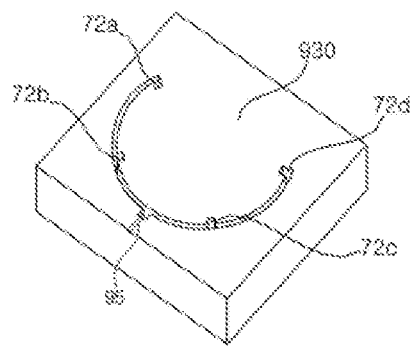
FIGS. 8A to 8C illustrate steps of a manufacturing method according to an embodiment of the present invention.
Figure 8B:
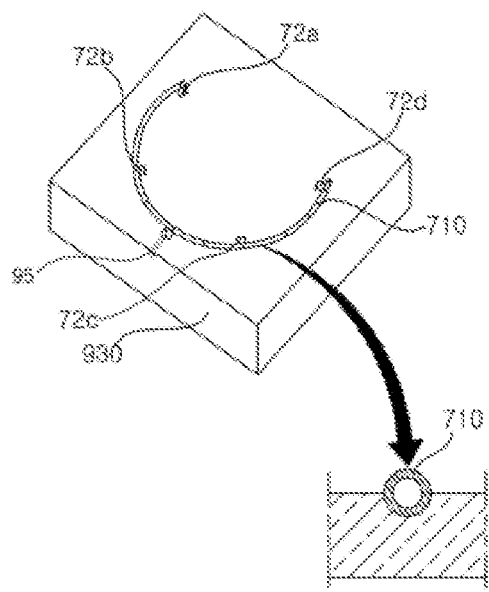
Figure 8C:
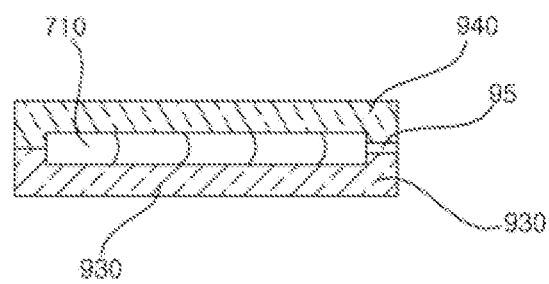
Figure 9A:
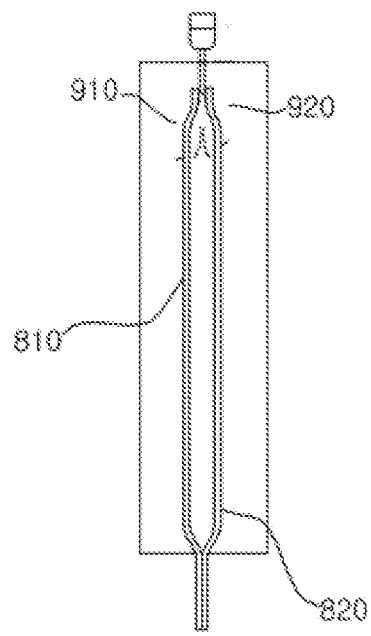
FIG. 9A schematically illustrates an assembled state of molds according to a conventional manufacturing method.
Figure 9B:
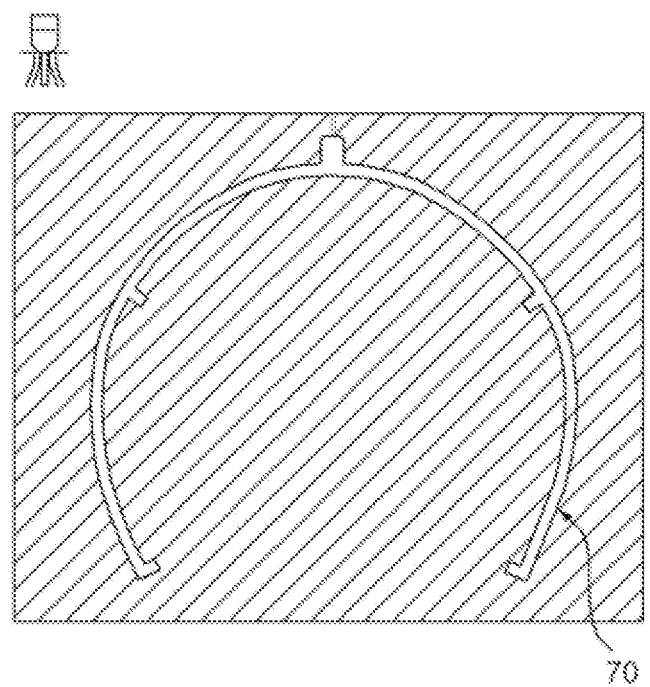
FIG. 9B illustrates an opened-up state of the mold.

FIG. 7 is a flowchart illustrating a manufacturing method according to an embodiment of the present invention. FIGS. 8A to 8C illustrate steps of a manufacturing method according to an embodiment of the present invention.

Hereinafter, a manufacturing method according to an embodiment of the present invention with reference to FIGS. 7 and 8 is a method for manufacturing a conduit 70 that supplies circulating water to a plurality of circulation nozzles 610 formed in a gasket 60 of a washing machine.

In the manufacturing method according to an embodiment of the present invention, while nozzle water supply ports 72a, 72b, 72c, and 72d are inserted into a mold, a transport pipe 71 is formed by extrusion molding using a molten parison 710. The nozzle water supply ports 72a, 72b, 72c, and 72d may be molded objects, and a material thereof may be identical or different from a material of the parison 710.

The mold may include a lower mold 930 and an upper mold 940. In the lower mold 930, a first cavity is formed in a shape corresponding to an external appearance of a lower portion (preferably, a half of the lower part) of a conduit placed in a horizontal direction, and the cavity has an open top surface so that the parison 710 can be positioned therein.

The upper mold 940 is assembled with the lower mold 930 from above, and, in the upper mold 940, a second cavity is formed in a shape corresponding to the rest part (approximately, a half of the upper part) of the conduit 70, except a portion formed by the cavity formed in the lower mold 930.

FIGS. 8A to 8C show a state in which a plurality of nozzle water supply ports 72a, 72b, 72c, and 72d is positioned in the first cavity of the lower mold 930 while the molds 930 and 940 are opened up (S1). Here, the plurality of nozzle water supply ports 72a, 72b, 72c, and 72d is pre-molded and preferably molded objects.

The plurality of nozzle water supply ports 72a, 72b, 72c, and 72d corresponds a kind of insert embedded in the molten parison 710 that is to be positioned in the cavity in the step S3 which will be described later. In some embodiments, even an inlet port 75 pre-molded prior to the step S3 may be positioned in the cavity of the lower mold 930.

Thereafter, a molten parison 710 having a hollow opening may be formed by extruding a raw material or a material of the transport pipe 71 (S2). The parison 710 is extruded in a long tubular shape from an extruder (not shown), and temperature of the parison 710 being extruded from the extruder is approximately from 195° C. to 205° C., and preferably 200° C.

The parison 710 from the extruder may be placed in the cavity where the insert (the nozzle water supply ports 72a, 72b, 72c, and 72d and/or the inlet port 75) is positioned at the step S1. At the step S2, the parison 710 from the extruder may be cut by an appropriate length and then placed in the cavity. The process of cutting the parison 710 and inserting the same into the cavity may be automatically performed by equipment, but aspects of the present invention are not limited thereto, and the process may be manually performed by a person.

While the parison 710 is placed in the cavity of the lower mold 930, the upper mold 940 and the lower mold 930 are assembled (S3). In this case, the both open ends of the parison 710 are sealed as being pressed by the upper mold 940 and the lower mold 930. In this state, gas of high pressure is injected through a gas injection passage 95 formed in the molds 930 and 940 (S5). The gas may be air, but aspects of the present invention are not limited thereto. The process of injecting gas of high pressure is a technique widely used in blow extrusion molding, and thus, a detailed description thereof is herein omitted. Temperature of the parison 710 at the beginning of injecting gas may be preferably from 180° C. and 190° C.

When gas is injected, a hollow hole in the parison 710 expands and thus the parison 710 is brought into an inner surface of the cavity in the molds 930 and 940, thereby forming the transport pipe 71. If gas of temperature lower than temperature of the parison 710 is injected, the temperature of the parison 710 is neutrally lowered in the course of injecting gas. However, as aspects of the present invention are not limited thereto, and an operation of forcibly lowering the temperature of the parison 710 before opening the mold may be further implemented or an operation of waiting until the parison 710 is naturally cooled may be further performed.

Thereafter, the upper mold 940 and the lower mold 930 are opened up (S6), and a molded product, in which the parison 710 and the plurality of nozzle water supply ports 72a, 72b, 72c, and 72d are engaged (in some embodiments, a molded object including even the input port 75 when the inlet port 75 is configured as an additional insert), is extracted (S7).

As for the extracted molded product, the parison 710 expanded in the course of injecting gas at the step S5 intrudes even the nozzle water supply ports 72a, 72b, 72c, and 72d, and thus, the passage may be blocked by the parison 710. Therefore, the operation (S8) of clearing the blocked passage is performed. In this case, the blocked passage may be cleared by an automatic punching equipment or by a manual operation. In this case, if the inset port 75 is inserted, the inlet port 75 may be cleared in the same manner of clearing the plurality of water supply ports 72a, 72b, 72c, and 72d.

Meanwhile, in the case where the inlet port 75 is not configured as an additional insert, an operation of processing the inlet port 75 communicating with the hollow opening of the parison 710 in a molded product (in a shape in which the plurality of nozzle water supply ports 72a, 72b, 72c, and 72d and the parison 710 are engaged) extracted from the molds 930 and 940 may be further performed.

The cavity of the molds 930 and 940 includes a portion corresponding to the inlet port 75, and the parison 710 is inserted even into the aforementioned portion in the gas injection step (S5), thereby forming a protrusion forming the external appearance of the inlet port 75. Although the protrusion protrudes from an outer circumferential surface of the transfer duct 71, a passage thereof is blocked. Therefore, the inlet port 75 is processed by a step of punching a passage communicating with the hollow opening in the protrusion.

The washing machine, and the method of manufacturing a conduit applied in the washing machine according to present invention reduce a waste of materials disposed in the manufacturing process, thereby improving productivity.

Second, since the conduit is molded using a tubular-shaped having a hollow opening, it is possible to rule out a possibility of water leakage from a final product's pipe formed by the hollow opening.

Third, since blow molding is performed with pre-molded nozzle water supply ports being inserted into a mold, incomplete molding or molding defect of the nozzle water supply ports may be prevented, compared to the case where the nozzle water supply ports are molded integrally with the conduit.

Fourth, since the size of the conduit is changed, the same components can apply to the nozzle water supply port, and thus, commonality of components may improve when it comes to manufacturing conduits in various sizes.

As described above, the above description is an illustrative purpose only, and the present invention is not limited thereto. Thus, it should be understood that numerous other modifications and embodiments can be devised by those skilled in the art within the spirit and scope of the present invention and they will fall within the scope of the present invention.

What is claimed is:

1. A washing machine, comprising:
a casing that defines an introduction hole;
a tub that is disposed in the casing and defines an entrance opening configured to communicate with the introduction hole;
a drum rotatably disposed in the tub;
a pump configured to pump water discharged from the tub;
a gasket that has an annular shape and that connects between the introduction hole and the entrance opening;
a plurality of circulation nozzles disposed at the gasket and configured to supply water into the drum; and
a conduit fixed to the gasket and configured to guide water pumped by the pump to the plurality of circulation nozzles,
wherein the conduit comprises:
an inlet port configured to receive water pumped by the pump,
a transport pipe that extends from the inlet port and is configured to guide water received through the inlet port to the plurality of circulation nozzles, and
a plurality of nozzle water supply ports configured to supply water guided along the transport pipe to the plurality of circulation nozzles,
wherein the transport pipe comprises:
an inner diameter part that faces an outer circumferential surface of the gasket,
a plurality of communication holes that are defined at the inner diameter part of the transport pipe and in fluid communication with the plurality of nozzle water supply ports, respectively, and
a plurality of port connection grooves defined at positions corresponding to the plurality of communication holes, each of the plurality of port connection grooves being disposed at a circumference of one of the plurality of communication holes and receiving an entrance portion of one of the plurality of nozzle water supply ports,
wherein the entrance portion of each of the plurality of nozzle water supply ports defines a port opening configured to receive water discharged from a corresponding communication hole among the plurality of communication holes,
wherein the entrance portion of each of the plurality of nozzle water supply ports comprises a flange that extends outward in a radial direction of the port opening and is bonded to an inside of a corresponding port connection groove among the plurality of port connection grooves, and
wherein an outer surface of the flange comprises:
a first surface that extends outward in the radial direction of the port opening and is bonded to a floor of the corresponding port connection groove,
a second surface spaced apart from the first surface to thereby define a thickness of the flange, the second surface being exposed to an outside of the corresponding port connection groove, and
a conical slope that extends from the second surface and is inclined toward the first surface, the conical slope being bonded to the inside of the corresponding port connection groove.

2. The washing machine of claim 1, wherein each of the plurality of port connection grooves has a shape corresponding to a shape of the flange and allows the flange to be bonded to the inside of a corresponding port connection groove among the plurality of port connection grooves.

3. The washing machine of claim 1, wherein the plurality of circulation nozzles are disposed at an inner circumferential part of the gasket,
wherein the transport pipe is disposed at an outer circumferential part of the gasket, and
wherein each of the plurality of nozzle water supply ports is configured to pass through the gasket from the outer circumferential part to the inner circumferential part to thereby connect to one of the plurality of circulation nozzles.

4. The washing machine of claim 1, wherein the transport pipe is configured to divide and guide water introduced through the inlet port in two directions.

5. The washing machine of claim 1, wherein the transport pipe is made of a first material, and the plurality of nozzle water supply ports are made of a second material different from the first material.

6. The washing machine of claim 1, wherein the transport pipe comprises:
a first pipe part that extends from the inlet port to a first side of the gasket and that is configured to guide a first portion of water introduced through the inlet port; and
a second pipe part that extends from the inlet port to a second side of the gasket and that is configured to guide a second portion of water introduced through the inlet port.

7. The washing machine of claim 1, wherein the transport pipe is symmetrical with respect to the inlet port.

8. The washing machine of claim 1, wherein the plurality of circulation nozzles are arranged at positions on the gasket that are symmetrical with respect to a vertical extension line passing through a center of the gasket.

9. The washing machine of claim 1, wherein the second surface is in contact with an outer surface of the inner diameter part of the transport pipe adjacent to the second surface.

10. The washing machine of claim 1, wherein the transport pipe has an annular shape extending in a circumferential direction of the gasket, and
wherein the inner diameter part of the transport pipe extends in a longitudinal direction of the transport pipe.

11. The washing machine of claim 1, wherein the gasket further comprises a direct water nozzle disposed at an upper portion of the gasket and configured to spray water supplied from a water source, and
wherein the direct water nozzle is disposed vertically above an uppermost circulation nozzle among the plurality of circulation nozzles.

12. The washing machine of claim 11, wherein the plurality of circulation nozzles are disposed rearward of the direct water nozzle toward the entrance opening of the tub.

* * * * *